United States Patent
Berben et al.

(10) Patent No.: US 7,530,710 B2
(45) Date of Patent: May 12, 2009

(54) COLOR-TUNABLE ILLUMINATION SYSTEM FOR IMAGING ILLUMINATION

(75) Inventors: Dirk Berben, Taufkirchen (DE); Tim Fiedler, München (DE); Frank Jermann, Königsbrunn (DE)

(73) Assignee: Patent-Treuhand-Gesellschaft für elektrische Glühlampen mbH, München (DE)

( * ) Notice: Subject to any disclaimer, the term of this patent is extended or adjusted under 35 U.S.C. 154(b) by 0 days.

(21) Appl. No.: 11/805,006

(22) Filed: May 22, 2007

(65) Prior Publication Data
US 2007/0297171 A1 Dec. 27, 2007

(30) Foreign Application Priority Data
May 24, 2006 (DE) .................... 10 2006 024 461

(51) Int. Cl.
*F21V 5/00* (2006.01)
(52) U.S. Cl. .................... 362/231; 362/235; 362/355; 362/307; 362/308
(58) Field of Classification Search ............ 362/11, 362/231, 235, 249, 307, 311, 355, 308
See application file for complete search history.

(56) References Cited

U.S. PATENT DOCUMENTS

| | | | |
|---|---|---|---|
| 4,821,114 A | 4/1989 | Gebhardt | |
| 5,515,136 A | 5/1996 | Nishio et al. | |
| 6,630,801 B2 | 10/2003 | Schuurmans | |
| 6,995,355 B2 * | 2/2006 | Rains et al. | 250/228 |
| 7,144,131 B2 * | 12/2006 | Rains | 362/231 |
| 7,220,021 B2 * | 5/2007 | Wang et al. | 362/247 |
| 2007/0274068 A1 * | 11/2007 | Berben et al. | 362/231 |

* cited by examiner

*Primary Examiner*—Thomas M Sember
(74) *Attorney, Agent, or Firm*—Cohen Pontani Lieberman & Pavane LLP

(57) ABSTRACT

A color-tunable illumination system for imaging illumination having a tuning means and at least two light sources of different colors. The illumination system comprises a reflector having a reflector contour, the light sources being accommodated in the vicinity of the reflector contour, and a compact diffusing medium accommodated at the focal point of the reflector. The light from the light sources is directed substantially onto the diffusing medium and then, from there, is diffused onto the reflector contour, electronic driving of the light sources making it possible to regulate the intensity of the light sources separately from one another, with the result that the light leaving the reflector can be color-tuned.

9 Claims, 5 Drawing Sheets

COLOR-TUNABLE ILLUMINATION SYSTEM FOR IMAGING ILLUMINATION

FIELD OF THE INVENTION

The invention is based on a color-tunable illumination system for imaging illumination having a tuning means and at least two light sources of different colors. Such illumination systems are of particular interest for use in stage construction and effect lighting.

BACKGROUND OF THE INVENTION

U.S. Pat. No. 4,821,114 has disclosed an optical illumination system having a filter wheel and a white light source in the form of a lamp. In this case, blocking filters, such as absorption filters and dichroitic filters, for example, are used. They are inserted into the beam path of virtually point light sources such as xenon high-pressure discharge lamps. A continuous change in color is therefore only possible with a plurality of filter wheels and needs to be realized in a complex manner by mechanical means. The filter wheels are positioned one behind the other and rotated appropriately. The control is complex and the filters are very expensive.

Control for groups of LEDs is specified, for example, in U.S. Pat. Nos. 5,515,136 and 6,630,801. DE-Az 10 2005 041 319.6 has described a module in which a plurality of high-efficiency LEDs are combined on one printed circuit board. These are then imaged onto one point.

SUMMARY OF THE INVENTION

One object of the present invention is to provide a color-tunable illumination system which can be operated in a simple manner and rapidly and which functions in particular using purely electrical means.

This and other objects are attained in accordance with one aspect of the present invention directed to a color-tunable illumination system having a tuning means and at least two light sources of different colors, the illumination system comprising a reflector having a reflector contour, the light sources being accommodated in the vicinity of the reflector contour, a compact diffusing medium being accommodated at the focal point of the reflector, the light from the light sources being directed substantially onto the diffusing medium and, from there, being diffused onto the reflector contour, electronic driving of the light sources making it possible to regulate the intensity of the light sources separately from one another, with the result that the light leaving the reflector can be color-tuned.

In particular, each light source comprises a plurality of groups of similar light sources. In this case, the light sources may be LEDs, laser diodes or miniature lamps. Often, at least two, usually three or even more groups of light sources of different colors are used. A common grouping with high color rendering and high efficiency is provided if the light sources comprise three groups, which are selected on the basis of the RGB principle.

The illumination system preferably uses a compact diffusing medium, which has the shape of a sphere. The implementation of the sphere can take place by means of a drop. This drop can use a cast resin as the basic structure. An inert diffuser, in particular $Al_2O_3$ or $TiO_2$, advantageously in the form of particles dispersed in cast resin can be used as the actual diffusing means in the diffusing medium.

The diffusing medium can be held in the reflector in various ways. The most elegant way is a solution in which the reflector is filled with a casting compound, the diffusing medium being placed in the casting compound.

Finally, the diffusing medium acts as a virtual light source in the reflector. Its volume should therefore be as small as possible, in any case less than 50 mm$^3$, preferably $\leq$10 mm$^3$, in order to obtain an imageable light source.

BRIEF DESCRIPTION OF THE DRAWINGS

The invention will be explained in more detail below with reference to a plurality of exemplary embodiments. In the figures.

DETAILED DESCRIPTION OF THE DRAWINGS

Figure 1:
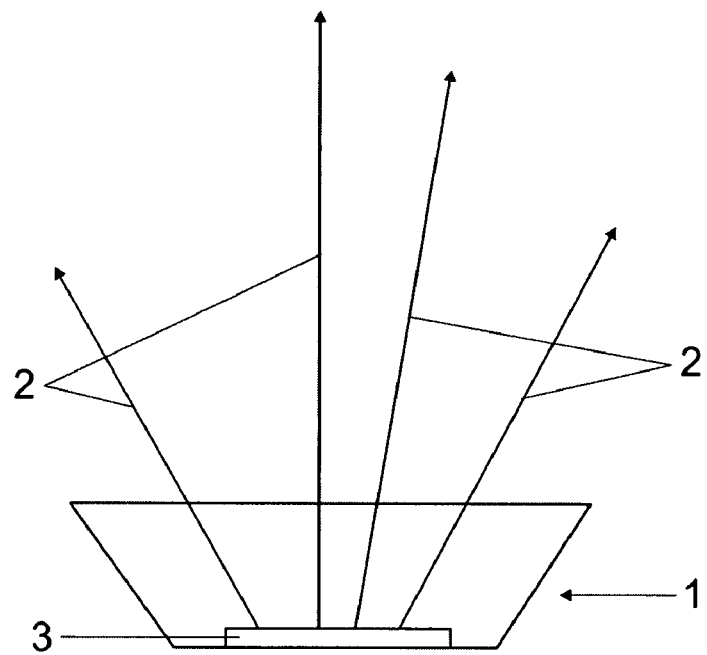
FIG. 1 shows the emission characteristic of a normal LED.

FIG. 1 shows the cosine emission characteristic of a normal LED 1. The beams 2 diverge from the chip 3 in all physical directions. The arrow length symbolizes the relative intensity.

Figure 2:
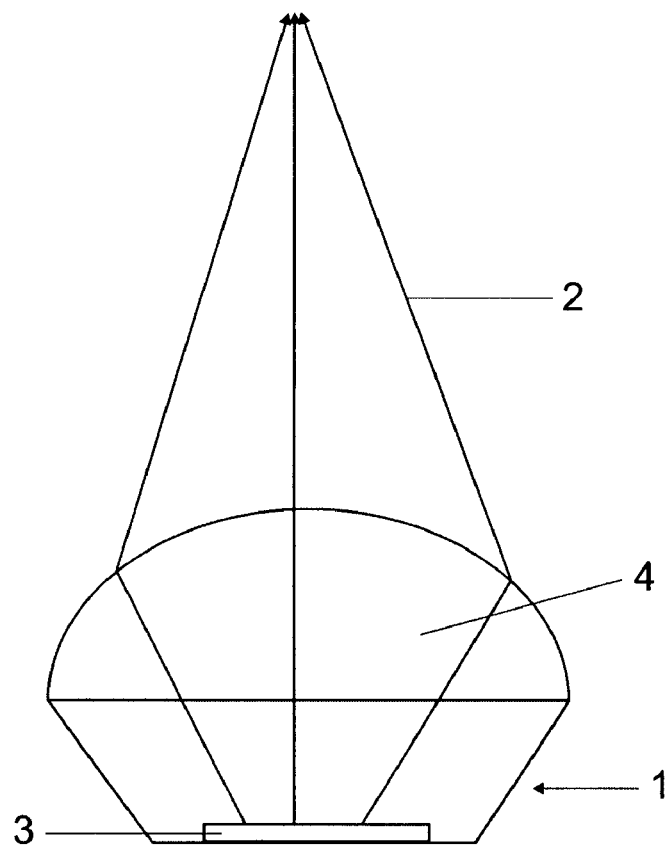
FIG. 2 shows the emission characteristic of an LED having a microlens.

FIG. 2 shows an LED 1 with a microlens 4 connected upstream, as is known per se. This has the object of focusing the light from the chip 3. Imaging onto a focused spot is therefore possible for an individual LED.

Figure 3:
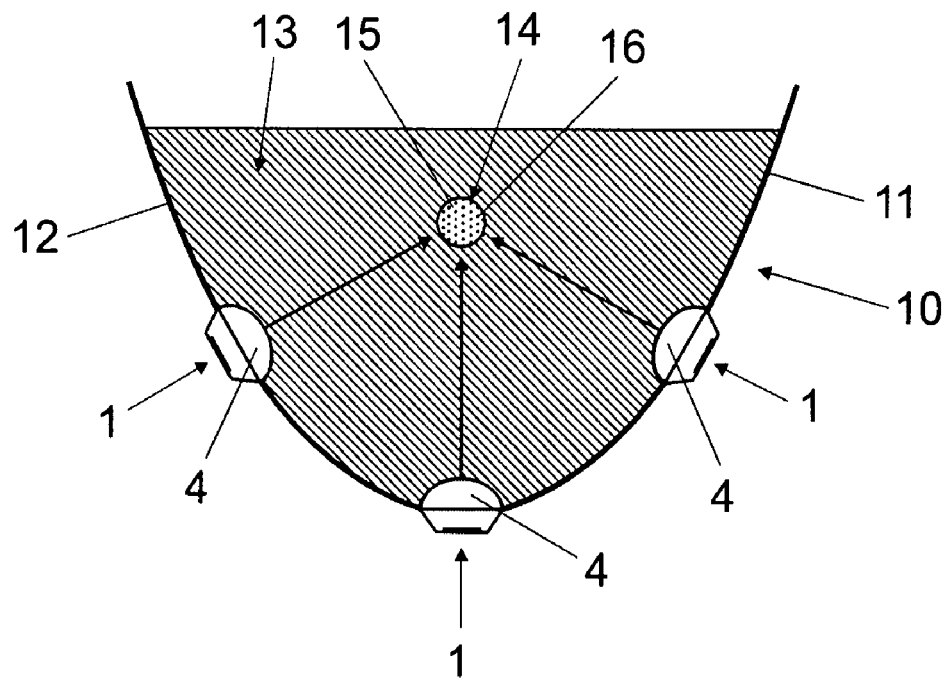
FIG. 3 shows an illumination system having a reflector, in cross section.

FIG. 3 shows, in cross section, an illumination system 10 having a plurality of LEDs 1 and having a reflector 11. This reflector has a contour 12, which is parabolic, for example. A plurality of LEDs with an imaging optical arrangement 4, for example a microlens, are positioned in the wall of the reflector contour 12. The reflector is filled with casting compound 13, as is known per se. A drop 14, which measures approximately 1 mm in diameter, is introduced as the diffusing means in the casting compound at the focal point of the reflector.

Figure 4:
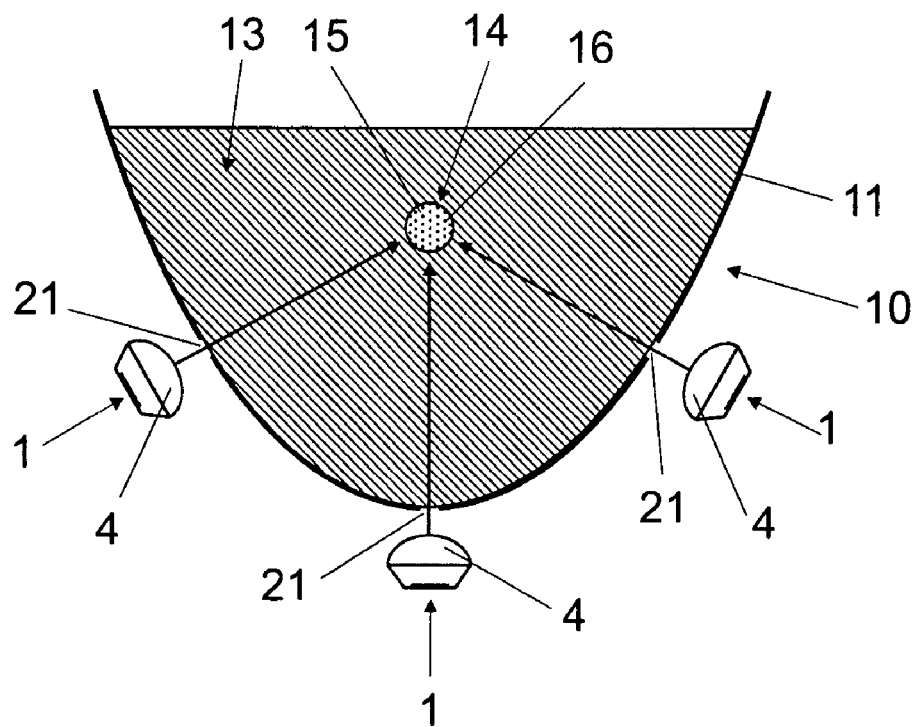
FIG. 4 shows an illumination system having a reflector, in cross section.

The LEDs can also be positioned outside of the reflector at a certain proximity to said reflector, as shown in FIG. 4; in each case only one opening 21 is required in the reflector in order to guide the light from an LED 1 up to the drop 14. This allows for simpler installation since there are no longer any problems with cooling and adjustment of the LEDs. In addition, the area in the contour which is subject to losses can be minimized.

The diffusing drop comprises a highly concentrated mixture of casting compound 15 such as epoxy resin and an inert diffuser. This inert diffuser is, for example, particles 16 which act as an inert diffuser, in particular $Al_2O_3$ or $TiO_2$ or the like. Any low-loss material with a sufficient sudden change in the refractive index and a suitable particle size is likewise in principle suitable for this purpose, for example YAG (undoped), $SiO_2$, all lamp phosphors. Actually only a pulverulent material with a white appearance is essential if its refractive index differs from the refractive index of the casting material. An alternative for the implementation of the inert diffuser is to implement the active drop as a plastic hybrid, i.e. to incorporate small particles of plastic having a relatively high refractive index in a casting compound having a low refractive index. Gas bubbles, for example air bubbles, in the casting material are likewise suitable as inert diffusers.

The diffusing medium is preferably spherical, but in the individual case it may also have another shape.

Figure 5:
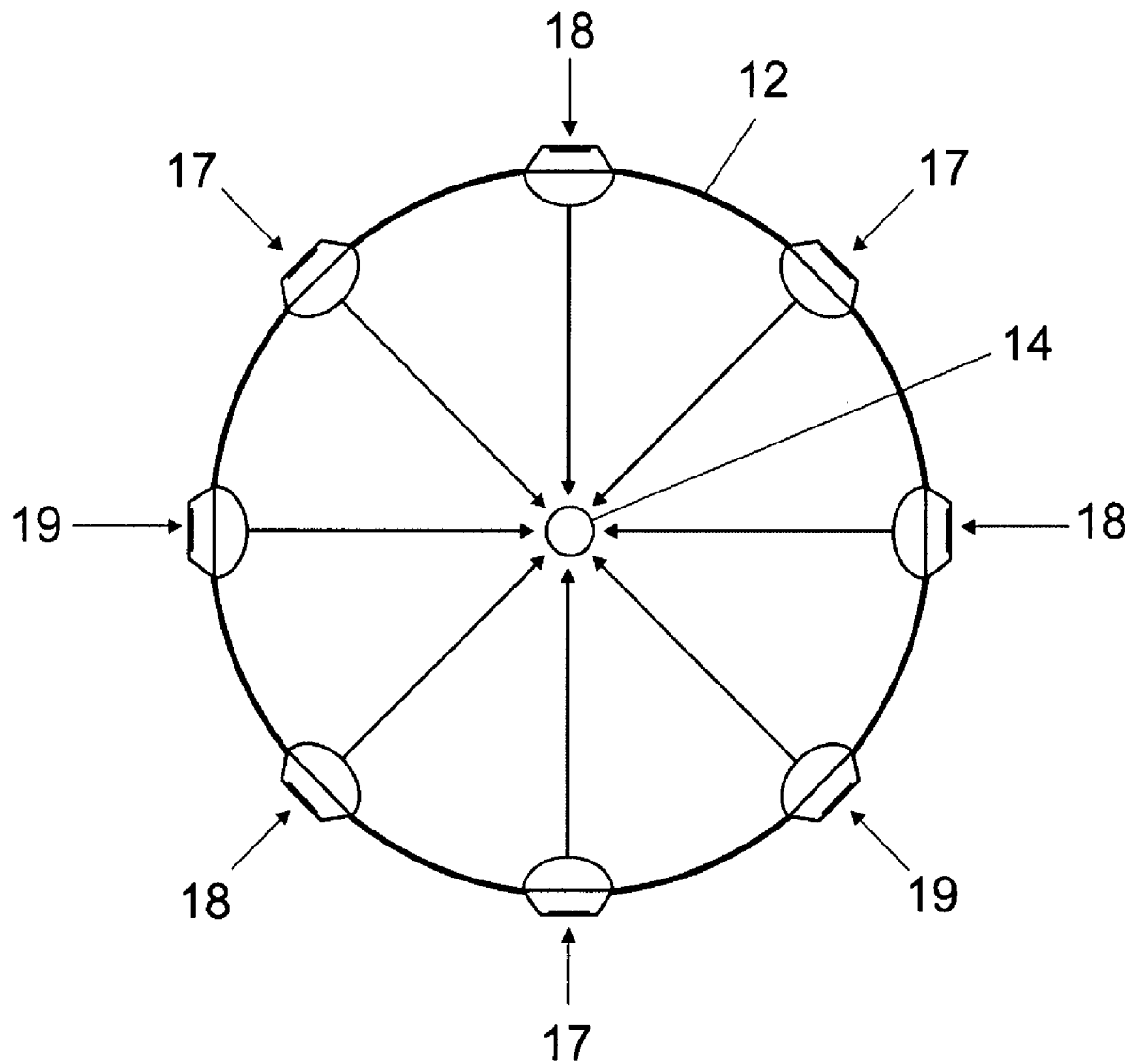
FIG. 5 shows a reflector, in plan view.

As shown in FIG. 5, groups of blue LEDs 17, green LEDs 18 and red LEDs 19 are let into the wall of the reflector which are each provided with microlenses for outputting light. Their optical arrangement is set such that the respective individual chip is imaged onto the diffusing medium. The number of individual LEDs is finally only limited by the size of the reflector.

In order not to impair the efficiency of the reflector too severely, the usable area of the reflector should not be too severely limited by the LEDs. An acceptable value is below 20%, in particular from 1 to 5%.

The diffusing drop diffuses the light from all the LEDs, given the appropriate selection of the concentration of diffusing particles, virtually isotropically. In the end result, the diffusing drop then acts as a point white or else colored light source in the reflector.

Driving of the LEDs is in this case preferably carried out in groups for the group of various colors, usually blue, green, red. This makes it possible to directly select any desired color locus, as is known per se for LEDs. There are many known methods for achieving this, for example as described in U.S. Pat. No. 6,630,801.

FIG. 5 shows a reflector, in plan view. The LEDs are split into three groups, which each emit blue, red or green. The LEDs are arranged such that they are distributed uniformly over the circumference of the reflector. They therefore ensure homogeneous illumination of the diffusing drop.

Figure 6:
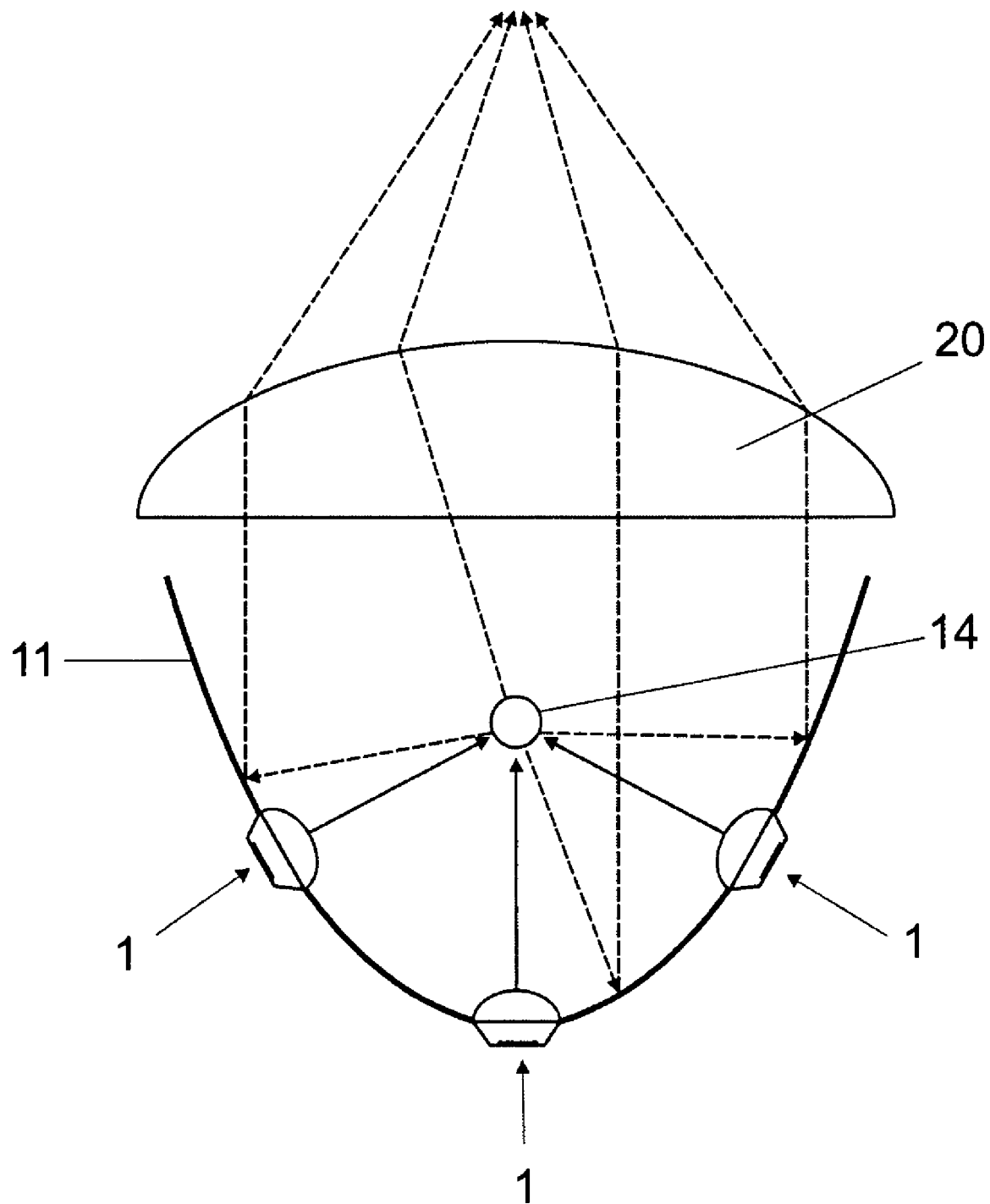
FIG. 6 shows the beam path in the reflector.

FIG. 6 shows, in cross section, how the light from the reflector 11 is emitted. Coming from the LEDs, it is diffused isotropically in the diffusing drop 14 and emitted. A condenser 20 may be positioned in front of the reflector and images the light onto one point. It is also possible for the light to be injected into a fiberoptic conductor.

By regulating the relative intensity of the groups of blue, green, red LEDs, the color locus can be adjusted as desired within wide limits. It is naturally also possible for other groups of LEDs to be used, in particular blue/yellow combinations or blue/green/orange/red combinations.

In addition to simple LEDs, laser diodes or miniature lamps are naturally also suitable as the light source. Laser diodes are most suited for many applications, for example in the automotive sector.

Advantageously, the diffusing medium can also be fixed mechanically in the reflector, for example by means of a wire or rod assembly, etc.

Advantageously, a free-form reflector, as is known per se, can also be used, in which case the shape of the diffusing drop does not have the form of a sphere but rather has a distortion different from this which is matched to the reflector.

The concept provides very many application possibilities. In principle, this novel lamp concept can supersede the entire present-day halogen incandescent lamp market. A few examples are as follows:

Automotive applications: for example for front headlights. The priority sequence of requirements is as follows:
  optical requirements (indicatrix, efficiency etc.),
  good maintenance and service life,
  cost.

General lighting applications: all types of halogen spotlights. Priority sequence of requirements is in this case as follows:
  cost,
  optical requirements (indicatrix, efficiency etc.),
  good maintenance and service life. The initially high cost of LED spotlights can be justified primarily in applications such as industrial lighting for spaces with a high ceiling and therefore high replacement costs.

Special applications: replacement for halogen spotlights for medicinal applications with very good color rendering;

Multi-color module: photo-optical applications, for example in stage construction;

Multi-color module: Adaptive illumination with tuning of the white tones with various color temperatures. This type of light source is much more attractive than the presently favored concept of hybrid lamps comprising a mixture of light source CFL+LED or FL+LED, in which a homogeneous color mixture can be achieved only with great difficulty. CFL means compact fluorescent lamp, FL means linear fluorescent lamp;

Multi-color module: disco and effect lighting with rapidly alternating colors.

In particular, firstly the reflector can be provided with a casting compound virtually as the filling. Another embodiment is a reflector which has not been filled, i.e. a reflector which contains air instead of a casting compound. Although it tends to have the disadvantage of a lower efficiency owing to the sudden changes in the refractive index and the diffusion losses brought about thereby, depending on the application it does offer advantages or more possibilities such as: lower costs, simpler installation and adjustment of the converter element (see below), no problems with the ageing of the casting compound, even in the vicinity of the small converter element where high radiation densities may occur. In the event of the use of a casting compound, the coefficients of thermal expansion of the casting compound and the reflector should be matched to one another as far as possible.

Until now, the "active drop" has been described as a specific embodiment as a drop with a diameter of typically approximately 1 mm and consisting of a highly concentrated mixture of casting compound, phosphor and inert diffuser (for example $Al_2O_3$ particles). However, the active drop can more generally be a converter element which is only restricted by its dimensions in the reflector. Alternatives to the shape of the sphere are, for example, also a coated platelet, which is bent so as to be in particular perfectly flat or else curved, a pyramid or an inverted pyramid, a pot or the like.

In addition, various materials can be used, for example also ceramic or a hollow sphere consisting of glass which is filled with converter material etc. In this case, care should be taken that the refractive index is selected suitably. Glass is available with a similar refractive index to the casting compound, which minimizes any interface refraction. Converter elements such as carrier platelets, shells or pots may be manufactured from glass (resistant, but heavy and fragile), plastic (light), aluminum (light) or else other metals.

In a particularly preferred embodiment, a reflecting element is fitted to the side which faces away from the reflector. This ensures that the light emitted by the converter element is also always guided via the reflector and therefore always takes the same path as the reflected excitation light. As a result, virtually perfect homogeneity is achieved.

Various exemplary embodiments are also possible for the reflector. In particular, the contour can be selected differently, for example to be elliptic or parabolic. In the case of a coated platelet or a glass sphere, mirror effects can be realized in a very simple manner.

Figure 7:
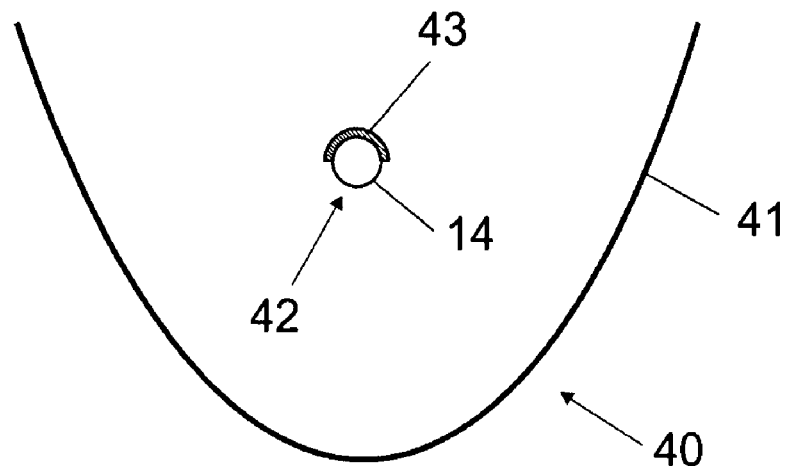
FIG. 7 shows a further exemplary embodiment of an illumination system.

FIG. 7 shows an illumination system 40 having a reflector contour 41 and a converter element 42 arranged therein with a drop 14 and an additional reflecting element, for example a specular layer 43, on part, in particular a hemisphere, of the drop-shaped converter 14.

The following applies for the dimensions of the converter element: the larger the converter element, the greater the discrepancies from the punctiform ideal case will be, the ideal case being when all the light leaves the reflector focused. While consequently small converters are more favorable for good imaging properties, such as are demanded, for example, in front headlights in the automotive sector, larger converters have other advantages: with correspondingly dimensioned lenses in front of the LEDs, which focus the excitation light onto this larger converter element as well, the irradiation intensity on the converter can be reduced. As a result, the problems and risks associated with ageing are reduced if the conversion element comprises polymers. In addition, the requirements for accuracy during adjustment of the converter element can be reduced and the manufacturing stability and yield can be increased and the production costs reduced. Furthermore, the divergence of the spot can be increased and controlled in combination with the reflector, which is of particular interest for applications in general lighting.

Figure 8A:
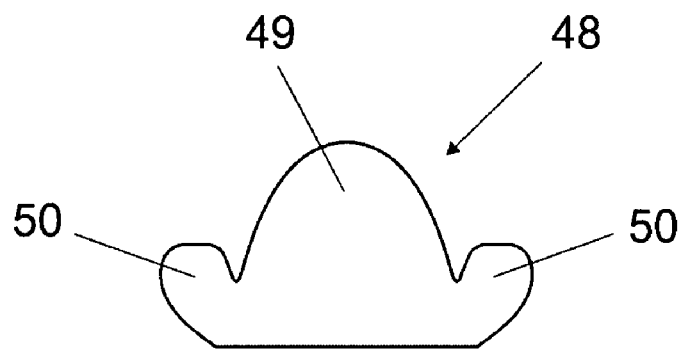
FIGS. 8a and 8b show various lens shapes.
Figure 8B:
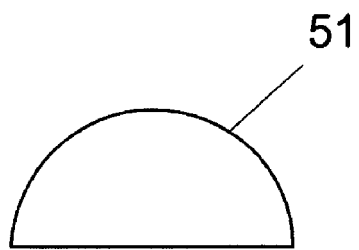

Furthermore, the problem of the imaging of light sources onto the converter element will be discussed. For reasons of completeness, reference will be made to the fact that lenses can also be used instead of a reflector. A suitable material is not only glass (advantage: high refractive index possible, as a result smaller design possible, in addition good maintenance and service life) but also plastic, for example polycarbonate. The latter has the advantage that it is lighter and less expensive than glass. The geometry of the lenses may mean that special shapes are required, as illustrated in FIG. 8. For example FIG. 8*a* shows a shape in which the lens 48 is reminiscent of a thumbscrew with a hemispherical center 49 and two wings 50 attached to the side. FIG. 8*b* shows a lens 51 with a conventional hemispherical shape.

The reflector of the LED itself can be considered as an alternative imaging element, either in combination with a lens or even on its own without a lens.

A fixed frame can of course hold the three components, the LEDs, the converter element and the reflector, if the reflector is sufficiently thin and light. The frame at the same time performs the function of dissipating heat from the light sources.

For general lighting or for special applications, solutions are also possible in which the reflector is designed to be so robust that it also performs the function of the frame.

In order to install and adjust the converter element, the following should be taken into consideration: if a casting compound is used, it is possible for the converter element to be introduced without any fixing means: for example the reflector is cast up to the level of the focal point, then the converter element is positioned and only then is the casting compound filled in further. Alternatively, the converter element may also be fixed permanently to a frame, which also holds the light sources, by means of a wire or another fixing means. This frame may be a reflector which is designed to be robust. The fixing takes place by means of soldering, welding, cold-welding etc. If no casting compound is used, at least one wire is required for the fixing. Demands placed on the wire are, inter alia, the fact that its thermal expansion is matched to the reflector. The material used should be robust and highly reflective. Possibly, a coating may be used for this purpose.

Depending on the application, it is advantageous to provide a possibility for adjusting the converter element. This takes place, for example, by means of thin, highly reflecting wires, which run through a polymer drop as the converter or which can be fitted to a metal carrier in the form of a platelet, a shell or a pot. At least two wires are required to provide the possibility of adjustment.

Instead of wires, a thin transparent disk-like fixing element can also be used. It should be as flat as possible, but a curved version is also possible. This element may also have, in addition, a protective function and/or terminate the reflector. If the conversion element consists at least partially of glass, polycarbonate or another plastic, a thin transparent disk consisting of the same material may also be suitable for fixing purposes, for example.

We claim:

1. A color-tunable illumination system having a tuning means and at least two light sources of different colors, wherein the illumination system comprises:
    a reflector having a reflector contour and a focal point, the light sources being accommodated in the vicinity of the reflector contour; and
    a compact diffusing medium located at the focal point of the reflector,
    wherein light from the light sources is directed substantially onto the diffusing medium and then, from there, is diffused onto the reflector contour, electronic driving of the light sources making it possible to regulate the intensity of the light sources separately from one another, with the result that the light leaving the reflector can be color-tuned.

2. The illumination system as claimed in claim 1, wherein each light source comprises a plurality of groups of similar light sources.

3. The illumination system as claimed in claim 1, wherein the light sources are LEDs, laser diodes or miniature lamps.

4. The illumination system as claimed in claim 1, wherein three groups of light sources of different colors are used.

5. The illumination system as claimed in claim 1, wherein the compact diffusing medium has the shape of a sphere, a pyramid or a pot and in particular is provided with a reflecting coating on part of its surface.

6. The illumination system as claimed in claim 1, wherein the compact diffusing medium contains an inert diffuser, in particular in the form of particles dispersed in cast resin, in particular $Al_2O_3$ or $TiO_2$.

7. The illumination system as claimed in claim 1, wherein the reflector is filled with a casting compound, the diffusing medium being placed in the casting compound.

8. The illumination system as claimed in claim 1, wherein the light sources comprise three groups, which are selected on the basis of the RGB principle.

9. The illumination system as claimed in claim 1, wherein the volume of the compact diffusing medium is less than 50 $mm^3$, preferably $\leq 10$ $mm^3$.

* * * * *